(12) United States Patent
Honda et al.

(10) Patent No.: US 10,408,484 B2
(45) Date of Patent: Sep. 10, 2019

(54) AIR-CONDITIONING APPARATUS WITH A REFRIGERANT LEAK SENSOR IN AN INDOOR UNIT

(71) Applicant: DAIKIN INDUSTRIES, LTD., Osaka-shi, Osaka (JP)

(72) Inventors: Masahiro Honda, Settsu (JP); Shigeki Kamitani, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 69 days.

(21) Appl. No.: 15/562,399

(22) PCT Filed: Mar. 28, 2016

(86) PCT No.: PCT/JP2016/059880
§ 371 (c)(1),
(2) Date: Sep. 27, 2017

(87) PCT Pub. No.: WO2016/158847
PCT Pub. Date: Oct. 6, 2016

(65) Prior Publication Data
US 2018/0283718 A1    Oct. 4, 2018

(30) Foreign Application Priority Data

Mar. 31, 2015  (JP) ................. 2015-071398

(51) Int. Cl.
*F24F 11/36* (2018.01)
*F25B 49/02* (2006.01)
(Continued)

(52) U.S. Cl.
CPC .............. *F24F 11/36* (2018.01); *F24F 11/52* (2018.01); *F24F 11/74* (2018.01); *F24F 11/76* (2018.01);
(Continued)

(58) Field of Classification Search
CPC .. F24F 11/36; F24F 11/52; F24F 11/74; F24F 11/76; F24F 11/77; F24F 11/89; F24F 2110/10; F24F 2110/50
(Continued)

(56) References Cited

U.S. PATENT DOCUMENTS

2003/0213254 A1* 11/2003 Koo ................. F25B 13/00
 62/174
2008/0168783 A1* 7/2008 Kojima ............. F25B 13/00
 62/151
(Continued)

FOREIGN PATENT DOCUMENTS

JP   10-281569 A   10/1998
JP   3610812   * 10/2004
(Continued)

OTHER PUBLICATIONS

International Search Report of corresponding PCT Application No. PCT/JP2016/059880 dated Jun. 14, 2016.
(Continued)

*Primary Examiner* — Henry T Crenshaw
(74) *Attorney, Agent, or Firm* — Global IP Counselors, LLP

(57) ABSTRACT

An air-conditioning apparatus includes at least one indoor unit with intake and blow-out ports, a refrigerant gas sensor disposed in an air flow path inside the indoor unit; and a control device. The indoor unit has an indoor fan drawing indoor air in from the intake port and blowing conditioned air out from the blow-out port, an indoor temperature sensor detecting temperature of the indoor air, an indoor-side refrigerant circuit circulating a refrigerant having a greater specific gravity when gasified than air and producing conditioned air from the indoor air, and at least one refrigerant temperature sensor detecting refrigerant temperature in the refrigerant circuit. The control device drives the indoor fan
(Continued)

in accordance with at least one of an operation mode and a detection value of the at least one refrigerant temperature sensor, and detects refrigerant leakage using the refrigerant gas sensor.

10 Claims, 12 Drawing Sheets

(51) Int. Cl.
*F24F 11/89* (2018.01)
*F24F 11/52* (2018.01)
*F25B 49/00* (2006.01)
*F24F 110/50* (2018.01)
*F25B 13/00* (2006.01)
*F24F 11/74* (2018.01)
*F24F 11/76* (2018.01)
*F24F 11/77* (2018.01)
*F24F 110/10* (2018.01)
*F24F 140/00* (2018.01)

(52) U.S. Cl.
CPC .............. *F24F 11/77* (2018.01); *F24F 11/89* (2018.01); *F25B 13/00* (2013.01); *F25B 49/005* (2013.01); *F25B 49/02* (2013.01); *F24F 2110/10* (2018.01); *F24F 2110/50* (2018.01); *F24F 2140/00* (2018.01); *F25B 2313/0233* (2013.01); *F25B 2313/0293* (2013.01); *F25B 2313/0314* (2013.01); *F25B 2500/222* (2013.01); *F25B 2700/00* (2013.01); *F25B 2700/2104* (2013.01)

(58) Field of Classification Search
USPC ........................................................ 62/186
See application file for complete search history.

(56) References Cited

U.S. PATENT DOCUMENTS

| | | | |
|---|---|---|---|
| 2010/0293975 A1* | 11/2010 | Kawano | F25B 13/00 62/149 |
| 2011/0174059 A1* | 7/2011 | Yonemori | F25B 49/005 73/40 |
| 2013/0061619 A1* | 3/2013 | Saitou | F24F 11/77 62/89 |
| 2014/0123685 A1 | 5/2014 | Kim et al. | |
| 2015/0059367 A1* | 3/2015 | Emo | F25B 49/02 62/77 |
| 2015/0068234 A1* | 3/2015 | Sugiyama | F24F 1/0003 62/126 |
| 2016/0091241 A1* | 3/2016 | Suzuki | F25B 49/005 62/186 |
| 2018/0299169 A1* | 10/2018 | Suzuki | F25B 1/005 |

FOREIGN PATENT DOCUMENTS

| | | |
|---|---|---|
| JP | 2005-241121 A | 9/2005 |
| JP | 3744330 B2 | 2/2006 |
| JP | 2010-203685 A | 9/2010 |
| JP | 5063346 B2 | 10/2012 |
| JP | 2013-104619 A | 5/2013 |
| JP | 2014-115011 A | 6/2014 |
| JP | 2014-224611 A | 12/2014 |
| WO | 2015/004747 A1 | 1/2015 |

OTHER PUBLICATIONS

International Preliminary Report of corresponding PCT Application No. PCT/JP2016/059880 dated Oct. 12, 2017.
European Search Report of corresponding EP Application No. 16 77 2728.8 dated Dec. 13, 2017.

* cited by examiner

AIR-CONDITIONING APPARATUS WITH A REFRIGERANT LEAK SENSOR IN AN INDOOR UNIT

CROSS-REFERENCE TO RELATED APPLICATIONS

This U.S. National stage application claims priority under 35 U.S.C. § 119(a) to Japanese Patent Application No. 2015-071398, filed in Japan on Mar. 31, 2015, the entire contents of which are hereby incorporated herein by reference.

TECHNICAL FIELD

The present invention relates to an air-conditioning apparatus, and particularly relates to an air-conditioning apparatus provided with an indoor-side refrigerant circuit through which a flammable refrigerant circulates.

BACKGROUND ART

Certain air-conditioning apparatuses known in the prior art include a floor-installed unit, which is configured so that when a refrigerant having greater specific gravity when gasified than air leaks within the unit, the unit can be configured to form an accumulation of gas refrigerant near the bottom surface of the unit, and a refrigerant gas sensor can be installed in a location where the gas refrigerant can accumulate. For example, Japanese Patent No. 3744330 discloses an air-conditioning apparatus in which a refrigerant gas sensor is installed in proximity to a drain pan of the unit and refrigerant leakage occurring within the unit is detected.

SUMMARY

Technical Problem

However, in an air-conditioning apparatus provided with, e.g., a ceiling-mounted indoor unit in which an intake port and a blow-out port are formed in a bottom surface, when refrigerant leakage occurs within the indoor unit, a gasified refrigerant flows into an indoor space below from the intake port and/or the blow-out port, and it is therefore difficult for refrigerant leakage to be detected even if the refrigerant leakage occurs within the indoor unit.

An object of the present invention is to provide an air-conditioning apparatus provided with an indoor unit that uses a refrigerant having greater specific gravity when gasified than air, wherein the reliability of refrigerant leakage detection can be improved.

Solution to Problem

An air-conditioning apparatus according to a first aspect of the present invention comprises: at least one indoor unit in which an intake port and a blow-out port are formed, the indoor unit having an indoor fan drawing indoor air in from the intake port and blowing conditioned air out from the blow-out port, an indoor temperature sensor to detect the temperature of the indoor air, an indoor-side refrigerant circuit circulating a refrigerant having a greater specific gravity when gasified than air and producing conditioned air from the indoor air, and at least one refrigerant temperature sensor detecting the temperature of the refrigerant in the indoor-side refrigerant circuit; a refrigerant gas sensor provided in an air flow path inside the at least one indoor unit; and a control device driving the indoor fan in accordance with an operation mode and/or a detection value of the at least one refrigerant temperature sensor and detecting refrigerant leakage through the use of the refrigerant gas sensor.

In the air-conditioning apparatus of the first aspect, because the control device drives the indoor fan in accordance with an operation mode and/or a detection value of a refrigerant temperature sensor and detects refrigerant leakage through the use of the refrigerant gas sensor, leaked refrigerant that has accumulated in a room below the indoor unit can be drawn into the indoor unit by the driving of the indoor fan, and refrigerant leakage can be detected by the refrigerant gas sensor using the leaked refrigerant drawn in from the room.

An air-conditioning apparatus according to a second aspect of the present invention is the air-conditioning apparatus according to the first aspect, wherein the indoor-side refrigerant circuit of the at least one indoor unit has a liquid-side connecting part, a gas-side connecting part, an indoor heat exchanger, and an indoor electric valve connected to a liquid side of the indoor heat exchanger; and the at least one refrigerant temperature sensor of the at least one indoor unit includes a first refrigerant temperature sensor disposed between the gas-side connecting part and the indoor heat exchanger, a second refrigerant temperature sensor disposed between the indoor heat exchanger and the indoor electric valve, and a third refrigerant temperature sensor disposed between the indoor electric valve and the liquid-side connecting part.

In the air-conditioning apparatus of the second aspect, because at least one refrigerant temperature sensor is disposed each between the gas-side connecting part and the indoor heat exchanger, between the indoor heat exchanger and the indoor electric valve, and between the indoor electric valve and the liquid-side connecting part, the possibility of refrigerant leakage can be predicted without using the refrigerant gas sensor in most parts of the indoor-side refrigerant circuit, a sampling operation can be performed when the possibility of refrigerant leakage is high, and the number of sampling operations can be reduced when the possibility of refrigerant leakage is low.

An air-conditioning apparatus according to a third aspect of the present invention is the air-conditioning apparatus according to the first or second aspect, wherein the control device causes the at least one indoor unit to perform a sampling operation to drive the indoor fan in order to detect refrigerant leakage through the use of the refrigerant gas sensor when an operation for air conditioning has been stopped.

In the air-conditioning apparatus of the third aspect because the refrigerant, which has a greater specific gravity when gasified than air, accumulates in a bottom part of a space in the room and concentration rises due to stop of the indoor unit, the indoor unit performs the sampling operation when an operation for air conditioning has been stopped, whereby the reliability of refrigerant leakage detection is improved.

An air-conditioning apparatus according to a fourth aspect of the present invention is the air-conditioning apparatus according to the third aspect, further comprising a display device controlled by the control device, wherein the control device causes the display device to display operation information informing that the driving of the indoor fan is for the sampling operation.

In the air-conditioning apparatus of the fourth aspect, because of the display device displaying operation information informing that the driving of the indoor fan is for the sampling operation, the user can recognize the actual conditions of the sampling operation.

An air-conditioning apparatus according to a fifth aspect of the present invention is the air-conditioning apparatus according to the third or fourth aspect, wherein the control device causes the at least one indoor unit to perform the sampling operation for a predetermined time duration immediately after the at least one indoor unit has stopped.

In the air-conditioning apparatus of the fifth aspect, it is difficult to determine whether or not the sampling operation is necessary in accordance with the detection value of the refrigerant temperature sensor because the state of the indoor-side refrigerant circuit does not stabilize immediately after the indoor unit has stopped operating, however, it is possible to avoid a difficult determination of whether or not the sampling operation is necessary by having the sampling operation be performed immediately after the indoor unit has stopped operating.

An air-conditioning apparatus according to a sixth aspect of the present invention is the air-conditioning apparatus according to any one of the third through fifth aspects, further comprising an outdoor unit connected to the at least one indoor unit, wherein the control device causes the at least one indoor unit to perform the sampling operation when both the at least one indoor unit and the outdoor unit have stopped and the difference in detection values between the indoor temperature sensor and the at least one refrigerant temperature sensor is equal to or greater than a threshold value.

In the air-conditioning apparatus of the sixth aspect, when the indoor unit and the outdoor unit have stopped, the indoor-side refrigerant circuit stabilizes, the possibility of refrigerant leakage becomes easy to predict because of the difference in detection values between the indoor temperature sensor and the refrigerant temperature sensor, and the control device causes the indoor unit to perform the sampling operation when the difference in detection values between the indoor temperature sensor and the refrigerant temperature sensor is equal to or greater than a threshold value, whereby a sampling operation at an unnecessary timing can be omitted while the reliability of refrigerant leakage detection is improved.

An air-conditioning apparatus according to a seventh aspect of the present invention is the air-conditioning apparatus according to any one of the third through fifth aspects, further comprising an outdoor unit connected to the at least one indoor unit, wherein the at least one indoor unit includes a first indoor unit and a second indoor unit connected to the outdoor unit, and when one unit of the first indoor unit and the second indoor unit has stopped operating, the other unit is continuing to operate, and the outdoor unit is continuing to operate, the control device causes the one unit having stopped operating to intermittently perform the sampling operation.

In the air-conditioning apparatus of the seventh aspect, when one of the first indoor unit and the second indoor unit has stopped operating, the other unit is operating, and the outdoor unit is continuing to operate, the state of the indoor-side refrigerant circuit of the one unit does not stabilize; therefore, it is difficult to determine whether or not the sampling operation of the one unit is necessary in accordance with the detection value of the one refrigerant temperature sensor. However, it is possible to avoid a difficult determination of whether or not the sampling operation of the one unit is necessary by intermittently performing the sampling operation even if the one unit has stopped operating.

Advantageous Effects of Invention

With the air-conditioning apparatus according to the first aspect of the present invention, the reliability of refrigerant leakage detection can be improved.

With the air-conditioning apparatus according to the second aspect of the present invention, the number of sampling operations can be reduced while improving the reliability of refrigerant leakage detection.

With the air-conditioning apparatus according to the third aspect of the present invention, the reliability of refrigerant leakage detection improves.

With the air-conditioning apparatus according to the fourth aspect of the present invention, the problem of the user mistaking the sampling operation for an erroneous action of the air-conditioning apparatus can be prevented.

With the air-conditioning apparatus according to the fifth aspect of the present invention, it is possible to avoid a difficult determination of whether or not the sampling operation is necessary, and to improve the reliability of refrigerant leakage detection.

With the air-conditioning apparatus according to the sixth aspect of the present invention, a sampling operation at an unnecessary timing can be omitted and decrease in comfort because of the sampling operation can be restrained.

With the air-conditioning apparatus according to the seventh aspect of the present invention, there is an improvement in the reliability of refrigerant leakage detection when the outdoor unit is operating and one of the first indoor unit and second indoor unit has stopped.

Figure 1:
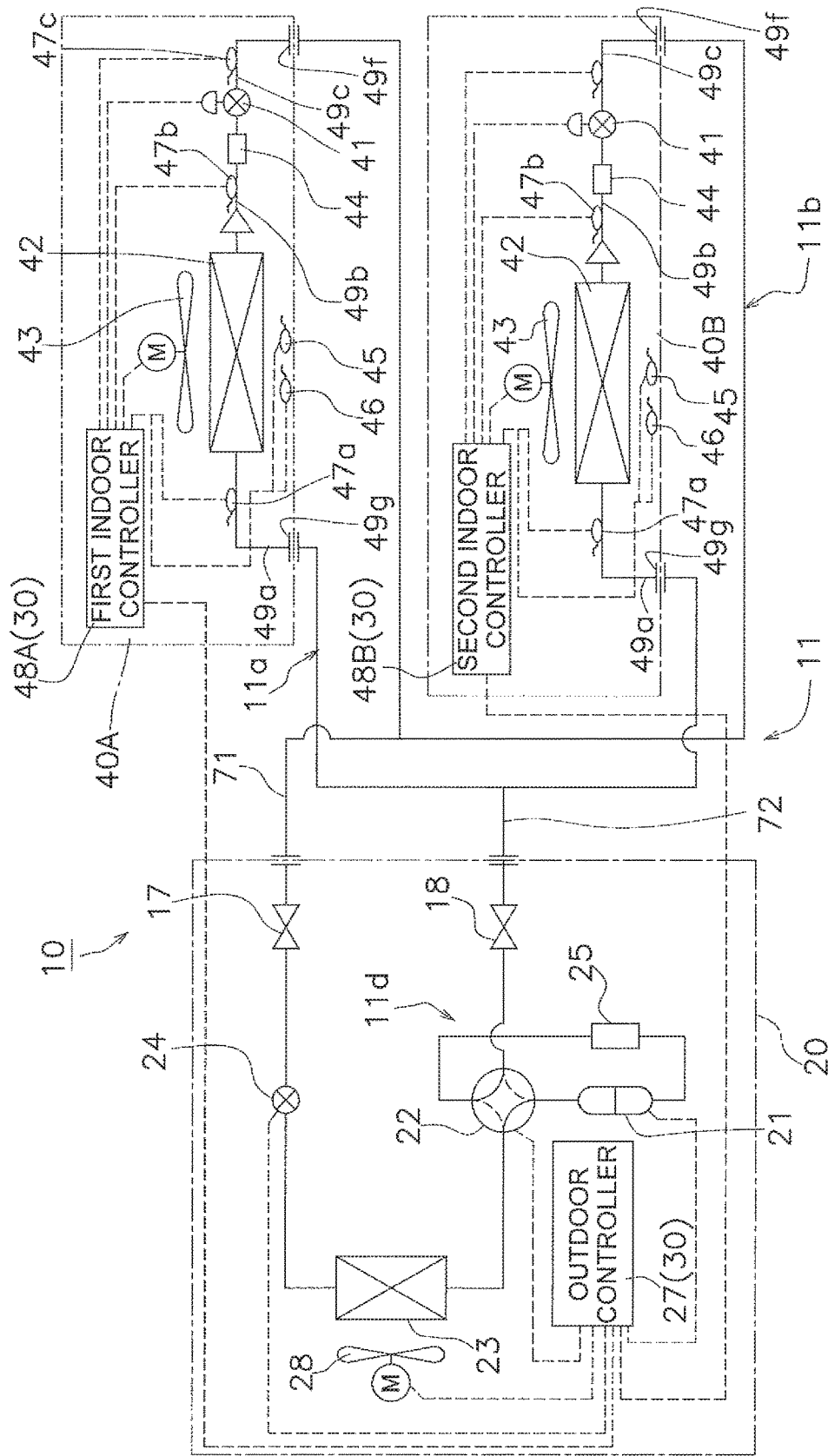
FIG. 1 is a refrigerant circuit diagram showing a schematic configuration of an air-conditioning apparatus according to an embodiment.

DESCRIPTION OF EMBODIMENTS (1) Summary of Configuration of Air-Conditioning Apparatus Shown in FIG. 1 is a refrigerant circuit showing a schematic configuration of an air-conditioning apparatus according to one embodiment of the present invention. An air-conditioning apparatus 10 is used for cooling and heating of rooms of, e.g., an office building or another type of building, by performing a vapor-compression refrigeration cycle operation. The air-conditioning apparatus 10 described in the present embodiment is provided with an outdoor machine 20 serving as one heat source unit, indoor machines 40A, 40B serving as a plurality (two in the present embodiment) of usage units connected to the outdoor machine 20, and a refrigerant communication tube 71 and a refrigerant communication tube 72 connecting the outdoor machine 20 and the indoor machines 40A, 40B. Specifically, a vapor-compression refrigerant circuit 11 of the air-conditioning apparatus 10 of the present embodiment is configured by connecting the outdoor machine 20, the indoor machines 40A, 40B, the refrigerant communication tube 71, and the refrigerant communication tube 72.

(1-1) Indoor Machines

Figure 2:
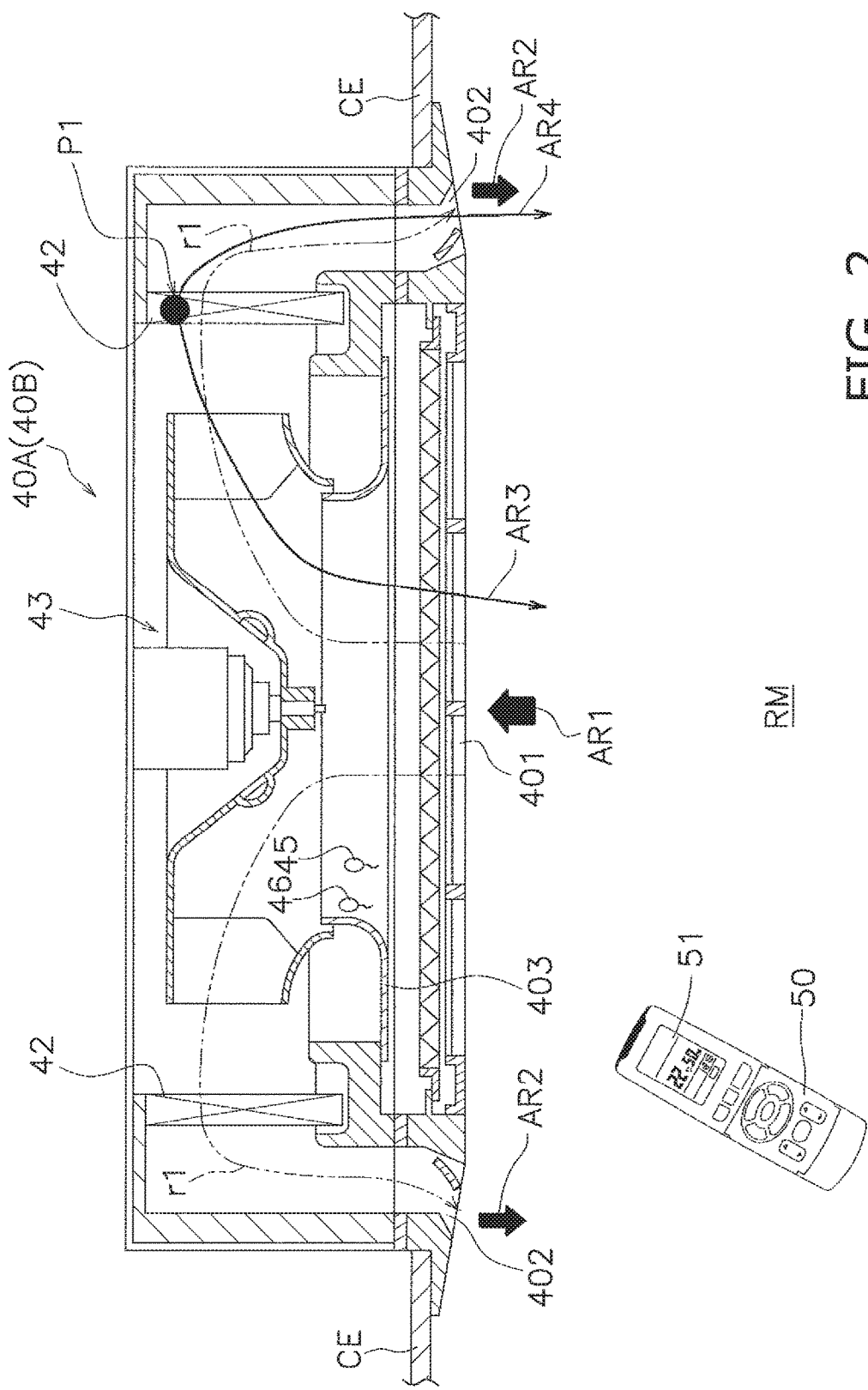
FIG. 2 is an indoor machine cross-sectional view for describing the actions of an indoor machine.
Figure 3:
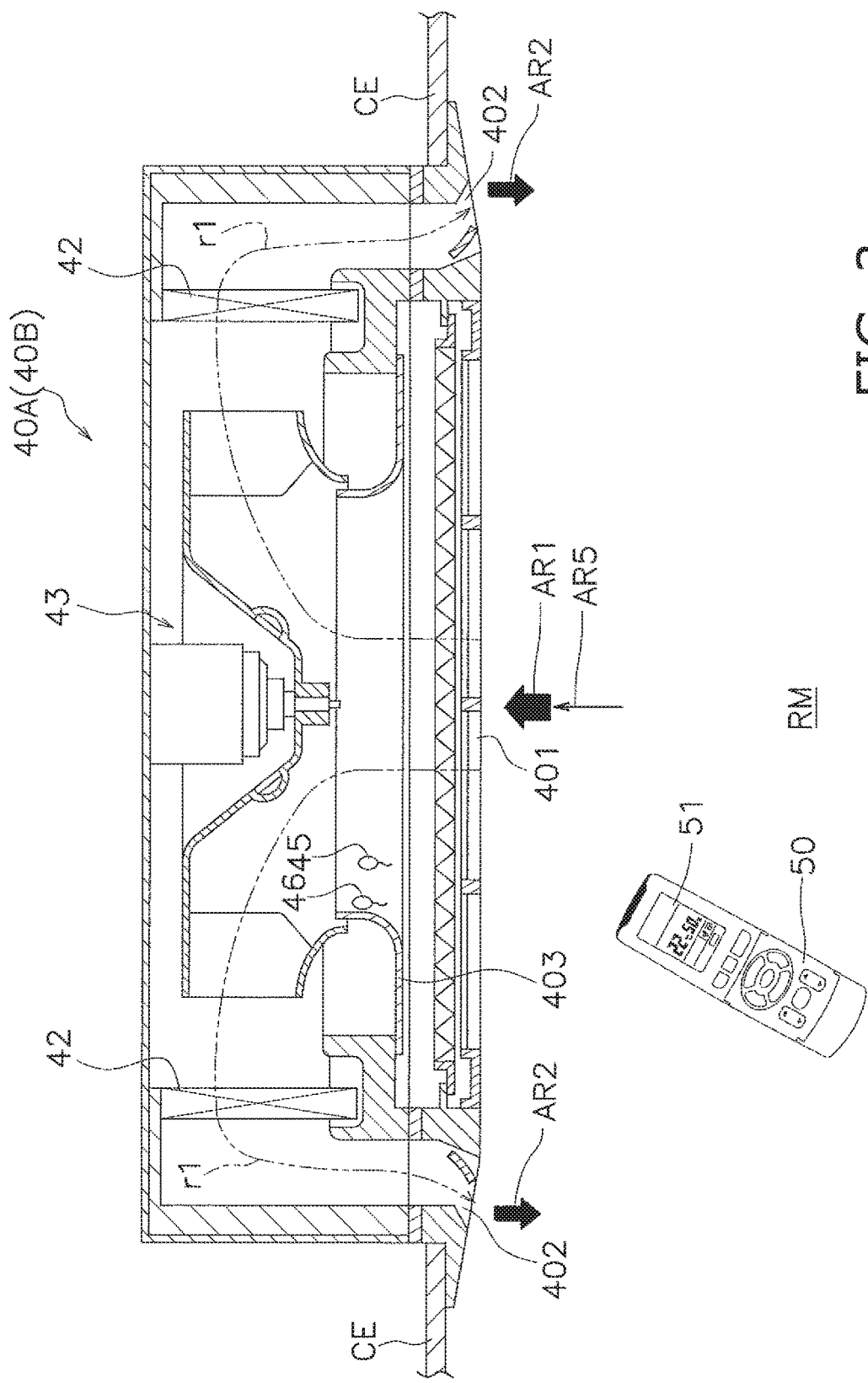
FIG. 3 is an indoor machine cross-sectional view for describing the actions of an indoor machine.

The indoor machines 40A, 40B are ceiling-mounted indoor units mounted by being, e.g., embedded in or suspended from a ceiling CE in a room of, e.g., an office building or another type of building, as shown in FIGS. 2 and 3. There are cases in which the indoor machines 40A, 40B are installed separately in, e.g., office rooms or another type of two rooms, and cases in which the indoor machines 40A, 40B are installed together in a conference room or another type of single room. In this embodiment, identically configured indoor machines 40A, 40B are described, and that which is shown in FIGS. 2 and 3 is the configuration of both the indoor machine 40A and the indoor machine 40B.

The indoor machines 40A, 40B have respective indoor-side refrigerant circuits 11a, 11b configuring part of the refrigerant circuit 11. A flammable refrigerant circulates through the refrigerant circuits 11a. 11b. The concept of flammability includes slightly flammable. Examples of flammable refrigerants include, e.g., R32 refrigerant, HFO-1234yf refrigerant, and HFO-1234ze refrigerant.

The indoor-side refrigerant circuits 11a. 11b each have an indoor electric valve 41 serving as an expansion mechanism, an indoor heat exchanger 42 serving as a usage-side heat exchanger, and a strainer 44 to filter impurities in the refrigerant. The indoor electric valves 41 are connected to liquid sides of the indoor heat exchangers 42 in order, e.g., to adjust the flow rate of the refrigerant flowing within the indoor-side refrigerant circuits 11a. 11b, and the indoor electric valves 41 are capable of blocking the passage of the refrigerant. The indoor heat exchangers 42, which are cross-fin-type fin-and-tube heat exchangers configured from, e.g., heat transfer tubes and numerous fins, function as refrigerant evaporators to cool an indoor space during a cooling operation, and function as refrigerant condensers to heat the indoor space during a heating operation. The indoor machines 40A, 40B each have an indoor fan 43 serving as an air blower for drawing indoor air into the apparatus. The indoor fan 43 supplies the indoor air into the room after the indoor air has been made to exchange heat with the refrigerant in the respective indoor heat exchanger 42. The indoor fans 43 are, e.g., turbofans.

The indoor-side refrigerant circuits 11a, 11b of the indoor machines 40A, 40B each have a refrigerant tube 49a to connect a gas-side connecting part 49g and the indoor heat exchanger 42, a refrigerant tube 49b to connect the indoor heat exchanger 42 and the indoor electric valve 41, and a refrigerant tube 49c to connect the indoor electric valve 41 and a liquid-side connecting part 49f.

The indoor machines 40A, 40B, having such a configuration, are each provided with various sensors in order to control the refrigeration cycle. The indoor machines 40A, 40B are each provided with a refrigerant gas sensor 45. Inside each of the indoor machines 40A, 40B, each of the refrigerant gas sensors 45 detects leaked gas refrigerant when the refrigerant circulating through each of the indoor-side refrigerant circuits 11a, 11b has leaked out into the atmosphere. The refrigerant gas sensors 45 of the indoor machines 40A, 40B are connected to a first indoor controller 48A and a second indoor controller 48B, respectively. The indoor machines 40A, 40B are also each provided with an intake temperature sensor 46 provided to, e.g., an intake port 401. The intake temperature sensors 46 of the indoor machines 40A, 40B measure the temperature of the indoor space and transmit a measurement value to the first indoor controller 48A and the second indoor controller 48B, respectively. The refrigerant gas sensors 45 are provided in proximity to, e.g., the intake temperature sensors 46, and the refrigerant gas sensors 45 and the intake temperature sensors 46 are attached to, e.g., bell mouths 403.

Refrigerant temperature sensors 47a of the indoor machines 40A, 40B detect the temperature of the refrigerant in the refrigerant tubes 49a connecting the gas-side connecting parts 49g and the indoor heat exchangers 42, and transmit detection values to the first indoor controller 48A and the second indoor controller 48B, respectively. Refrigerant temperature sensors 47b of the indoor machines 40A, 40B detect the temperature of the refrigerant in the refrigerant tubes 49b connecting the indoor heat exchangers 42 and the indoor electric valves 41, and transmit detection values to the first indoor controller 48A and the second indoor controller 48B, respectively. Refrigerant temperature sensors 47c of the indoor machines 40A, 40B detect the temperature of the refrigerant in the refrigerant tubes 49c connecting the indoor electric valves 41 and the liquid-side connecting parts 49f, and transmit detection values to the first indoor controller 48A and the second indoor controller 48B, respectively.

Additionally, the indoor machines 40A, 40B have the first indoor controller 48A and the second indoor controller 48B to control the actions of the components configuring the indoor machines 40A. 40B, respectively. The first indoor controller 48A and the second indoor controller 48B each have, e.g., a microcomputer (not shown) and/or a memory (not shown) provided in order to control the indoor machines 40A, 40B, and each are designed to be capable of exchanging, e.g., control signals with the outdoor machine 20 via a transmission line 80.

(1-2) Outdoor Machine

The outdoor machine 20 is installed outside of a building and connected to the indoor machines 40A, 40B via the refrigerant communication tube 71 and the refrigerant communication tube 72, and together with the indoor machines 40A, 40B, the outdoor machine 20 configures the refrigerant circuit 11. The outdoor machine 20 has an outdoor-side refrigerant circuit 11d configuring part of the refrigerant circuit 11. The outdoor-side refrigerant circuit 11d has a compressor 21, a four-way switching valve 22, an outdoor heat exchanger 23 serving as a heat-source-side heat exchanger, an indoor electric valve 41 serving as an expansion mechanism, an accumulator 25, and an outdoor fan 28 to blow air toward the outdoor heat exchanger 23.

The compressor 21 is capable of varying operational capacity, and is a positive-displacement compressor driven by a motor of which a rotational speed is controlled by an inverter. There is one compressor 21 of the outdoor machine 20 shown here, but in cases such as when there are a large number of indoor machines connected, the number of compressors can be two or more.

The outdoor-side refrigerant circuit 11d of the outdoor machine 20 is connected by the refrigerant communication tubes 71, 72 to the indoor-side refrigerant circuits 11a, 11b of the indoor machines 40A. 40B installed in the rooms, and together with the indoor machines 40A, 40B, the outdoor-side refrigerant circuit 11d configures the refrigerant circuit 11 of the air-conditioning apparatus 10.

A first port of the four-way switching valve 22 is connected to a discharge side of the compressor 21. One outlet/inlet of the outdoor heat exchanger 23 is connected to a second port of the four-way switching valve 22, the accumulator 25 is connected to a third port, and the refrigerant communication tube 72 is connected to a fourth port via a shutoff valve 18. The four-way switching valve 22 is switched to a path shown by solid lines during cooling, and the four-way switching valve 22 is switched to a path shown by dashed lines during heating operation.

During cooling operation, the refrigerant compressed and discharged by the compressor 21 is sent to the outdoor heat exchanger 23 via the four-way switching valve 22. During cooling operation, the outdoor heat exchanger 23 operates as a condenser, heat exchange with outside air takes place by the refrigerant condensation, and the refrigerant, having lost heat, is then sent to the outdoor electric valve 24. The outdoor electric valve 24 becomes fully open, liquid refrigerant that has passed through a shutoff valve 17 and the refrigerant communication tube 71 enters the indoor machines 40A, 40B from the respective liquid-side connecting parts 49f through the refrigerant communication tube 71, and the refrigerant flows to the indoor electric valves 41 through the refrigerant tubes 49c. In the indoor electric valves 41, the high-pressure liquid refrigerant changes to a low-pressure wet vapor. Having thus expanded in the outdoor electric valve 24, the refrigerant enters the indoor heat exchangers 42 through the refrigerant tubes 49b. During cooling operation, the indoor heat exchangers 42 operate as evaporators, heat exchange takes place between indoor air and the refrigerant by the refrigerant evaporation, and the refrigerant, having taken on heat, risen in temperature, and gasified, flows from the indoor heat exchangers 42, through the refrigerant tubes 49a and the gas-side connecting parts 49g, to the refrigerant communication tube 72. The gas refrigerant, having flowed into the refrigerant communication tube 72, passes through the refrigerant communication tube 72 and the four-way switching valve 22 to be sent to the accumulator 25 connected to an intake side of the compressor 21.

During heating operation, the refrigerant compressed by and discharged from the compressor 21 is sent from the four-way switching valve 22, through the refrigerant communication tube 72, and to the indoor heat exchangers 42 operating as condensers. Taking the opposite path from that of cooling operation, the refrigerant exiting the outdoor heat exchanger 23 operating as an evaporator is sent to the compressor 21. In other words, the refrigerant circulates through a path from the compressor 21, sequentially through the four-way switching valve 22, the refrigerant communication tube 72, the indoor heat exchangers 42, the refrigerant communication tube 71, the outdoor electric valve 24, the outdoor heat exchanger 23, the four-way switching valve 22, and the accumulator 25, and back to the compressor 21. During heating operation, liquid refrigerant expands in the outdoor electric valve 24, then passes through the outdoor heat exchanger 23, and the refrigerant changes to gas refrigerant.

During both cooling operation and heating operation, there are cases in which the operation of one of the indoor machines 40A, 40B is continued while the operation of the other is stopped. In such cases, the indoor electric valve 41 of the stopped machine is closed.

The outdoor machine 20 having such a configuration is provided with a temperature sensor, a pressure sensor, and other various sensors in order to control the refrigeration cycle, but descriptions of these sensors are omitted in this embodiment.

Additionally, the outdoor machine 20 has an outdoor controller 27 to control the actions of the components configuring the outdoor machine 20. The outdoor controller 27 has, e.g., a microcomputer (not shown) and a memory (not shown) provided in order to control the outdoor machine 20, and/or an inverter circuit to control motors of the compressor 21 and the outdoor fan 28, and the outdoor controller 27 is designed to be capable of exchanging, e.g., control signals with the first indoor controller 48A and the second indoor controller 48B of the indoor machines 40A, 40B via the transmission line 80. The outdoor controller 27, the first indoor controller 48A, and the second indoor controller 48B configure a control device 30.

(2) Detection of Refrigerant Leakage

The indoor heat exchangers 42 of the indoor machines 40A, 40B are disposed in positions corresponding to a plurality of blow-out ports 402, as shown in FIG. 2. For example, in a case in which the shape of each of the indoor machines 40A, 40B as seen from below is substantially square, four blow-out ports 402 are provided along the four sides of each square, and the indoor heat exchangers 42 are also disposed along the four sides of the squares. For example, in a case in which the refrigerant gas sensors 45 are attached near the left of the intake ports 401, such as is shown in FIG. 2, when leakage occurs at a point P1 extending along the right sides of the indoor heat exchangers 42 and the indoor fans 43 of the indoor machines 40A, 40B are stopped, leaked refrigerant gas flows in, e.g., the path of arrow AR3. Thus, when the leaked refrigerant gas flows through a spot far from where the refrigerant gas sensors 45 are attached, it is difficult for the refrigerant gas sensors 45 to detect the leaked refrigerant. While the indoor fans 43 are driven, air flows as shown by double-dash lines r1, and the refrigerant leaking out from the point P1 is therefore caught up in the airflow, and blown out from the blow-out ports 402 through a path shown by arrow AR4. Because the disposed positions of the refrigerant gas sensors 45 thus do not necessarily coincide with the flow path of the leaked refrigerant when the indoor fans 43 are driven, the reliability of leaked refrigerant detection is low. In FIGS. 2 and 3, each of arrows AR1 indicates indoor air drawn into each of the indoor machines 40A. 40B from within a room RM, and each of arrows AR2 indicates air blown out from each of the indoor machines 40A, 40B into the room RM.

Figure 4:
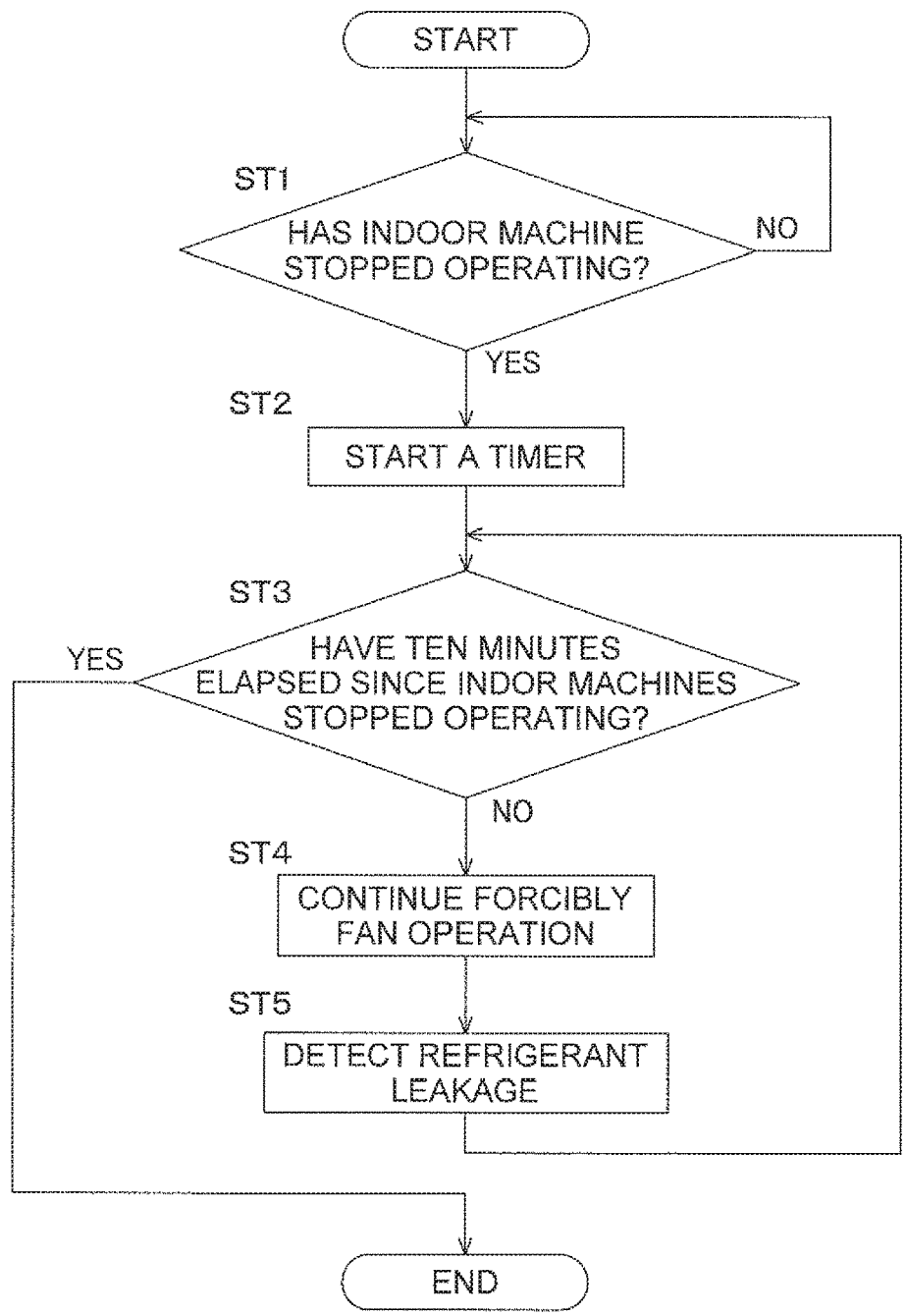
FIG. 4 is a flowchart for illustrating the detection of refrigerant leakage immediately after the indoor machine has stopped operating.

(2-1) Refrigerant Leakage Detection Immediately after Indoor Machines Stop Operating The indoor machines 40A. 40B perform refrigerant leakage detection immediately after having stopped operating, in accordance with an action procedure shown in FIG. 4. The first indoor controller 48A and the second indoor controller 48B detect respective operation stoppages (step ST1). The first indoor controller 48A and the second indoor controller 48B then count an elapsed time, each by using an internal timer immediately after the operation stoppage (step ST2).

The first indoor controller 48A and the second indoor controller 48B monitor if a certain time duration has elapsed since the operation stoppage of the indoor machines 40A. 40B (step ST3), and until the certain time duration elapses, the operation of the indoor fans 43 is forcibly continued (step ST4). When fan operation is forcibly continued, the first indoor controller 48A and the second indoor controller 48B perform refrigerant leakage detection through the refrigerant gas sensors 45 (step ST5).

For example, if the refrigerant is R32 refrigerant, the leaked R32 refrigerant is gasified. Because gasified R32 has heavier specific gravity than air, if there is no air flow, the refrigerant leaks out from the ceiling CE into the room RM, falls straight down through the room RM, and begins to accumulate near the floor of the room RM.

When the indoor fans 43 are driven during leakage, the R32 refrigerant leaking into the room RM is diffused in the room RM and a localized increase in concentration is avoided. As a result, even if the R32 refrigerant begins to leak immediately after operation stoppage, during the certain time duration when the indoor fans 43 are being driven, the refrigerant gas sensors 45 can detect the R32 refrigerant leaked in the room RM while the leaked R32 refrigerant remains at a comparatively safe concentration. When the indoor fans 43 are being driven during leakage, air is drawn in from the room RM as indicated by arrow AR1 in FIG. 3, and the R32 refrigerant is caught up in the air flow and drawn into the bell mouths 403 from below as indicated by arrow AR5. At the timepoint when the concentration of this drawn R32 refrigerant reaches a concentration that can be detected by the refrigerant gas sensors 45, the first indoor controller 48A and the second indoor controller 48B are able to detect the leakage of the R32 refrigerant.

(2-2) Refrigerant Leakage Detection while Indoor Machines have Stopped Operating (2-2-1) when Outdoor Machine has Also Stopped Operating The following two detection methods are described for a case in which the outdoor machine has also stopped operating. If either of these detection methods is executed, leaked R32 refrigerant can be detected even if the outdoor machine 20 has stopped operating in addition to the indoor machines 40A, 40B having stopped operating. The refrigerant leakage detection described below is executed after the end of the refrigerant leakage detection described in (2-1) above.

(2-2-1-1)

Figure 5:
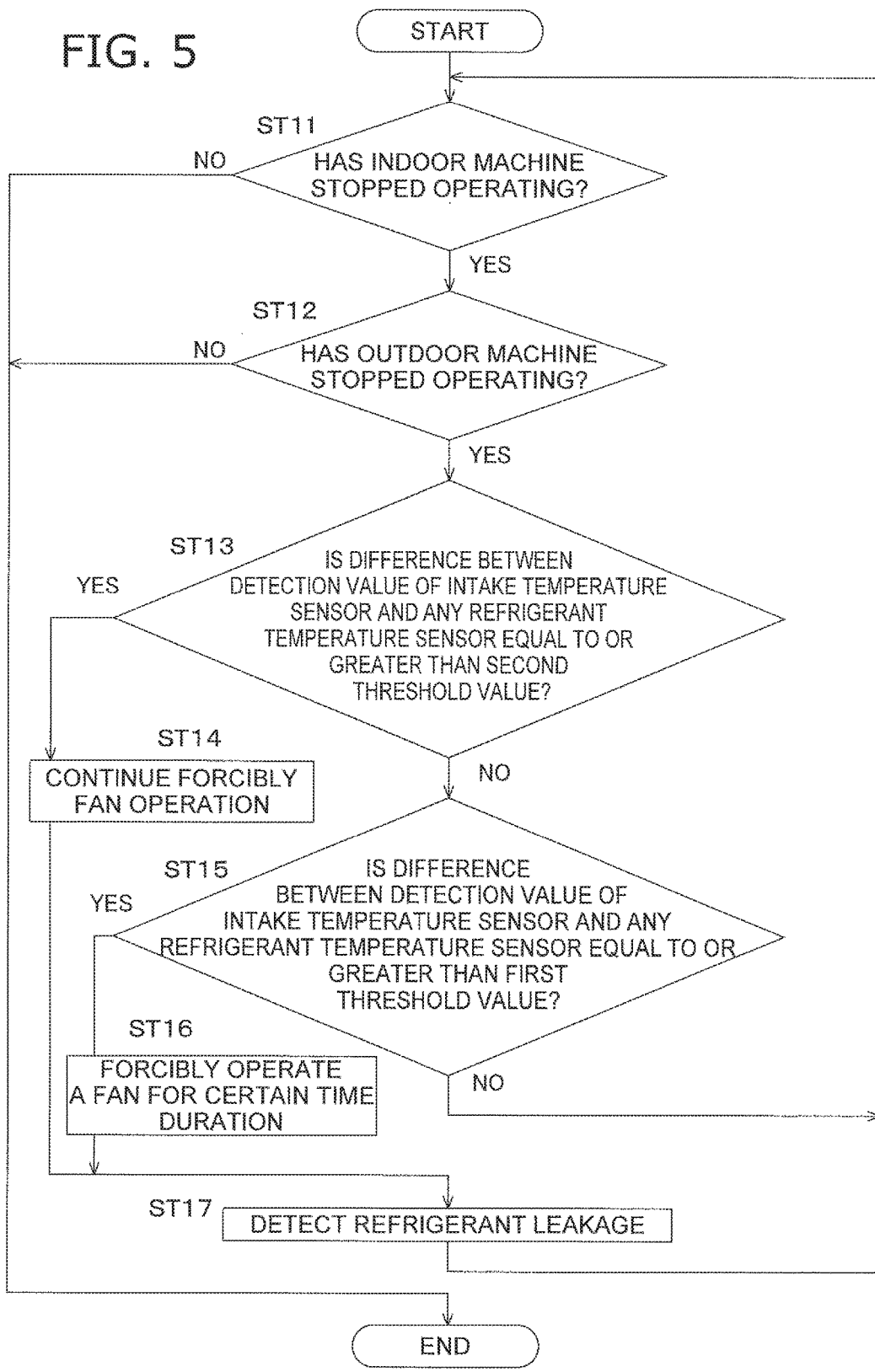
FIG. 5 is a flowchart for illustrating the detection of refrigerant leakage when an outdoor machine and an indoor machine have stopped operating.

With the refrigerant leakage detection method shown in FIG. 5, first, in the indoor machines 40A, 40B, each of the first indoor controller 48A and the second indoor controller 48B determines whether or not the operation of the corresponding indoor machine has stopped (step ST11). Moreover, each of the indoor controller 48A, 48B determines whether or not the operation of the outdoor machine 20 has stopped when the operation of the corresponding indoor machine has stopped, by referring to operation information of the outdoor machine 20 obtained through communication with the outdoor controller 27 (step ST12).

When the indoor machines 40A, 40B and the outdoor machine 20 have stopped operating, respective determinations are made in the first indoor controller 48A and the second indoor controller 48B as to whether or not a difference between a detection value of the refrigerant temperature sensor 47a and a detection value of the intake temperature sensor 46, a difference between a detection value of the refrigerant temperature sensor 47b and the detection value of the intake temperature sensor 46, and a difference between a detection value of the refrigerant temperature sensor 47c and the detection value of the intake temperature sensor 46 are equal to or greater than a second threshold value (step ST13). When the indoor machines 40A, 40B and the outdoor machine 20 became a stable state since a certain time duration has elapsed from the stopping of operation of the indoor machines 40A, 40B and the outdoor machine 20, an equivalent saturation temperature, which is converted from a refrigerant pressure of the R32 refrigerant, is substantially equal to an indoor temperature. Therefore, if there is no refrigerant leakage, there are no differences between the detection values of the refrigerant temperature sensors 47a, 47b, 47c and the detection value of the intake temperature sensor 46, assuming sensor error can be ignored. However, when refrigerant leakage has occurred, a detection value of certain sensor among the refrigerant temperature sensors 47a. 47b, 47c falls. The certain sensor is associated with a certain tube where the refrigerant leakage has occurred among the refrigerant tube 49a, 49b, 49c. The internal pressure of the certain tube decrease. Therefore, to have caused a difference between the detection values of the refrigerant temperature sensors 47a, 47b, 47c and the detection value of the intake temperature sensor 46 means that refrigerant leakage is suspected.

When the temperature difference between the detection value of the intake temperature sensor 46 and any of the detection values of the refrigerant temperature sensors 47a, 47b. 47c is equal to or greater than the second threshold value (Yes in step ST13), the first indoor controller 48A and/or the second indoor controller 48B of the indoor machines 40A, 40B that has gotten the temperature difference reached or exceeded the second threshold value continues to forcibly drive the indoor fan 43 (step ST14). The first indoor controller 48A and/or the second indoor controller 48B then performs refrigerant leakage detection using the refrigerant gas sensor 45 (step ST17).

The second threshold value is greater than a first threshold value, described hereinafter. The temperature difference being equal to or greater than the second threshold value means there is a higher possibility that the refrigerant is leaking than when the temperature difference is equal to or greater than the first threshold value and less than the second threshold value. In such cases, it is preferable to improve safety even at some expense of comfort, and the indoor fan 43 therefore continues to be driven.

In step ST13, when any temperature difference between the detection value of the intake temperature sensor 46 and the detection values of the refrigerant temperature sensors 47a, 47b, 47c is determined to be less than the second threshold value, the temperature difference is compared with the first threshold value (step ST15). When the temperature difference between the detection value of the intake temperature sensor 46 and any of the detection values of the refrigerant temperature sensors 47a, 47b. 47c is equal to or greater than the first threshold value (Yes in step ST15), the first indoor controller 48A and/or the second indoor controller 48B of the indoor machines 40A, 40B that has gotten the temperature difference reached or exceeded the first threshold value forcibly drives the corresponding indoor fan 43 for a certain time duration (step ST16). The first indoor controller 48A and/or the second indoor controller 48B then performs refrigerant leakage detection using the refrigerant gas sensor 45 (step ST17).

When the indoor machines 40A, 40B and the outdoor machine 20 have stopped operating, the loop process from step ST11 to ST17 is repeatedly performed. When, for example, the intake temperature sensor 46 and the refrigerant temperature sensors 47a, 47b, 47c are sampling temperature measurement values at certain intervals, the detection value of the intake temperature sensor 46 and the detection values of the refrigerant temperature sensors 47a, 47b, 47c may use values obtained by one sampling, but may also use an average of values obtained by multiple samplings. This calculation of an average value may be performed with each sensor for the intake temperature sensor 46 and the refrigerant temperature sensors 47a, 47b, 47c.

(2-2-1-2)

Figure 6:
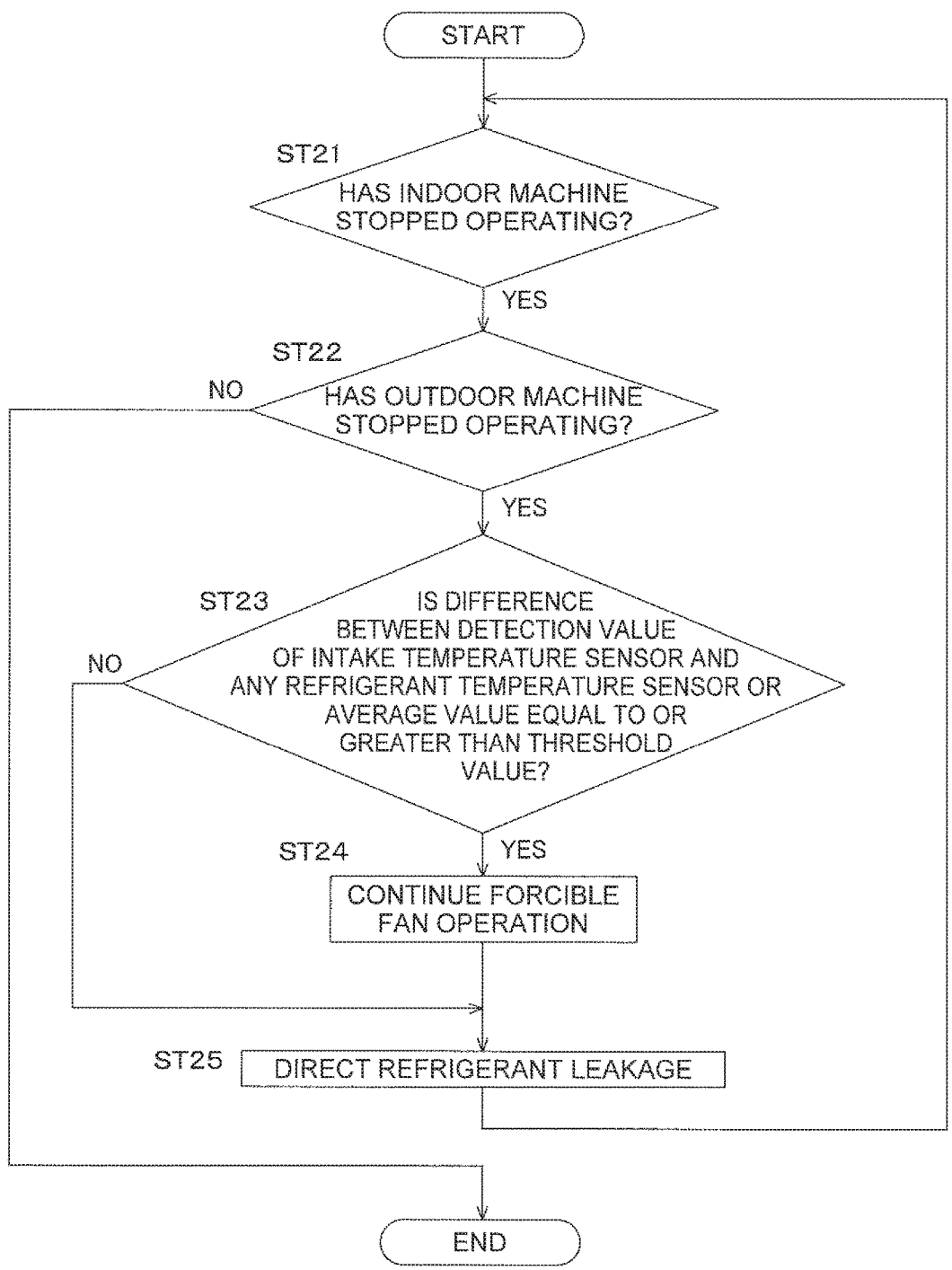
FIG. 6 is a flowchart for illustrating the detection of refrigerant leakage when an outdoor machine and an indoor machine have stopped operating.

With the refrigerant leakage detection method described using FIG. 5, a first threshold value and a second threshold value are used, but performing refrigerant leakage detection using only one threshold value is a refrigerant leakage detection method shown in FIG. 6.

With the refrigerant leakage detection method shown in FIG. 6, first, in the indoor machines 40A, 40B, each of the first indoor controller 48A and the second indoor controller 48B determine whether or not the operation of the corresponding indoor machine has stopped (step ST21). Moreover, each of the indoor controller 48A, 48B determines whether or not the operation of the outdoor machine 20 has stopped when the operation of the corresponding indoor machine has stopped, by referring to operation information of the outdoor machine 20 obtained through communication with the outdoor controller 27 (step ST22).

When the indoor machines 40A, 40B and the outdoor machine 20 have stopped operating, respective determinations are made in the first indoor controller 48A and the second indoor controller 48B as to whether or not the difference between the detection value of the refrigerant temperature sensor 47a and a detection value of the intake temperature sensor 46, the difference between the detection value of the refrigerant temperature sensor 47b and the detection value of the intake temperature sensor 46, and the difference between the detection value of the refrigerant temperature sensor 47c and the detection value of the intake temperature sensor 46 are equal to or greater than a threshold value (step ST23).

When the temperature difference between the detection value of the intake temperature sensor 46 and any of the detection values of the refrigerant temperature sensors 47a, 47b, 47c is equal to or greater than the threshold value (Yes in step ST23), the first indoor controller 48A and/or the second indoor controller 48B of the indoor machines 40A, 40B that has gotten the temperature difference reached or exceeded the threshold value continues to forcibly drive the corresponding indoor fan 43 (step ST24). The first indoor controller 48A and/or the second indoor controller 48B then performs refrigerant leakage detection (step ST25). While the indoor machines 40A, 40B and the outdoor machine 20 have stopped operating, the loop process from steps ST21 to ST25 is repeatedly performed.

(2-2-2) when Outdoor Machine is Continuing to Operate

When the indoor machines 40A, 40B are able to individually select continuing operation and stopping operation, there are cases in which one of the indoor machines 40A, 40B continues operation while the other stops operation. In such cases, the outdoor machine 20 continues operation. When the outdoor machine 20 is operated, it is difficult to distinguish the indications of refrigerant leakage using the detection value of the intake temperature sensor 46 and the detection values of the refrigerant temperature sensors 47a, 47b, 47c, even if the refrigerant leakage detection method described in (2-2-1) above is applied to the indoor machine that has stopped operating.

In view of this, when the outdoor machine 20 continues operation and one of the indoor machines 40A, 40B has stopped operation, in the one which has stopped operation, the indoor fan 43 is driven intermittently with no distinguishing of the indications of refrigerant leakage using the detection value of the intake temperature sensor 46 and the detection values of the refrigerant temperature sensors 47a, 47b, 47c.

Figure 7:
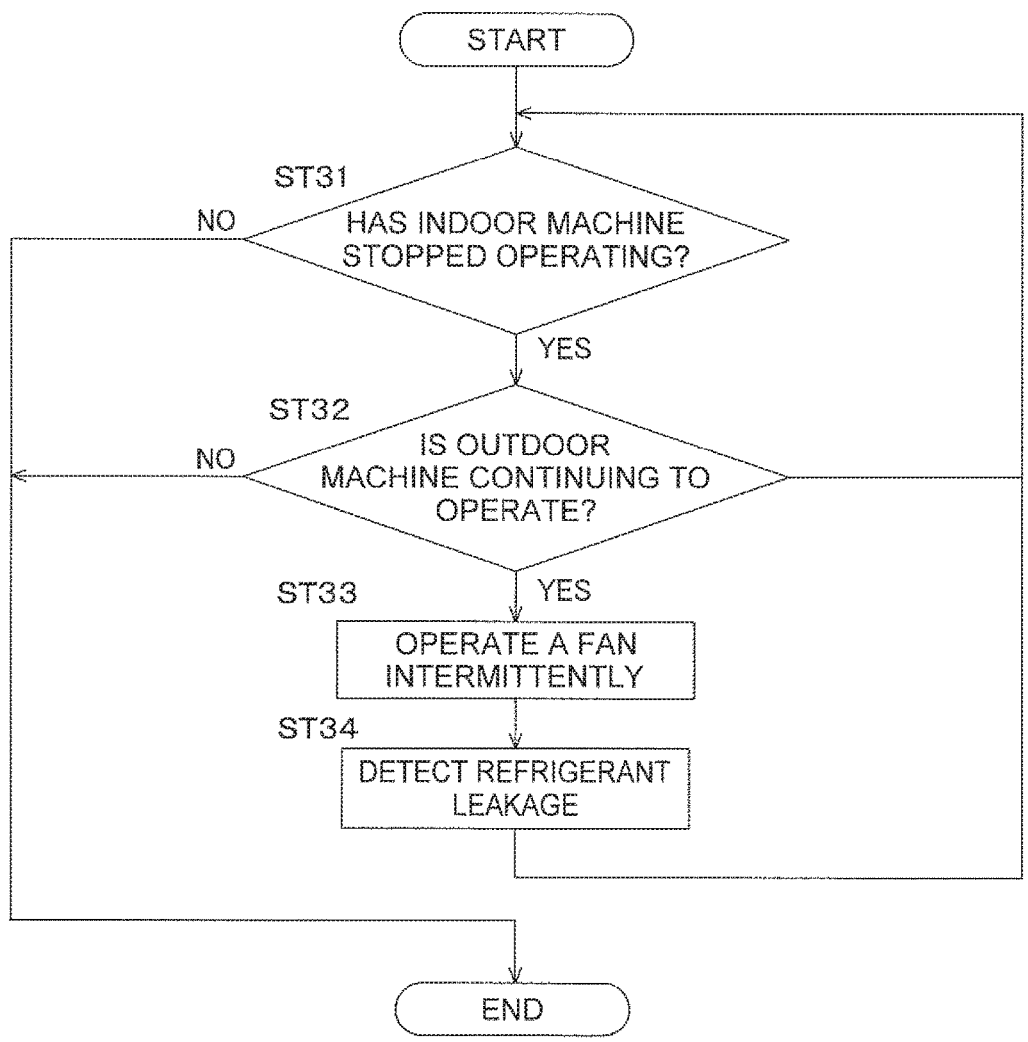
FIG. 7 is a flowchart for illustrating the detection of refrigerant leakage when the outdoor machine continues to operate and the indoor machine has stopped operating.

In the indoor machines 40A, 40B, the first indoor controller 48A and the second indoor controller 48B determine whether or not the operation of the corresponding indoor machines have stopped (step ST31), and the indoor controller determines whether or not the operation of the outdoor machine 20 is continuing when the operation of the corresponding indoor machine has stopped, by referring to operation information of the outdoor machine 20 obtained through communication with the outdoor controller 27 (step ST32), as shown in FIG. 7.

An example is described below of a case in which the indoor machine 40B and the outdoor machine 20 continue to operate while the indoor machine 40A has stopped operating. Although the indoor machine 40A has stopped operating, when the first indoor controller 48A of the indoor machine 40A recognizes that the indoor machine 40B and the outdoor machine 20 continue to operate (Yes in step ST32), the indoor fan 43 of the indoor machine 40A is intermittently driven (step ST33). The first indoor controller 48A repeats an intermittent operation of, e.g., driving the indoor fan 43 for ten minutes and stopping the indoor fan 43 for twenty minutes. The first indoor controller 48A performs refrigerant leakage detection using the refrigerant gas sensor 45 (step ST34).

(3) Display on Remote Controller

The indoor machines 40A, 40B are each provided with a remote controller 50, as shown in FIGS. 2 and 3. When the first indoor controller 48A and the second indoor controller 48B each forcibly drive the indoor fan 43 in order to perform refrigerant leakage detection using the refrigerant gas sensor 45, information to that effect is displayed on a display device 51 of the remote controller 50. The first indoor controller 48A and the second indoor controller 48B cause the display device 51 to display information such as, e.g., "currently in sampling operation." In this specification, the operation of forcibly driving the indoor fan 43 in order to perform refrigerant leakage detection is referred to as a sampling operation. Thus, a user is notified by the display device 51 that the indoor fan 43 is being forcibly driven in order to perform refrigerant leakage detection, whereby the user can be prevented from misinterpreting the sampling operation to be, e.g., a malfunction of the air-conditioning apparatus 10.

(4) Modifications (4-1) Modification 1A

In the above embodiment, a case was described in which two indoor machines 40A, 40B are connected to the outdoor machine 20, but another option is to have only one indoor machine connected. It is also an option to have three or more indoor machines connected to an outdoor machine. In the case of one indoor machine, the control described in section (2-2-2) above is unnecessary.

(4-2) Modification 1B

When the total amount of the refrigerant used in the air-conditioning apparatus 10 is a safe amount even if all of the refrigerant in the air-conditioning apparatus 10 leaks out into the room RM, refrigerant leakage detection itself is unnecessary to begin with. In such cases, a function may be provided to set the indoor machines 40A, 40B so as not to perform the sampling operation.

(4-3) Modification 1C

In the above embodiment, there were described a case in which the indoor fans 43 are driven according to the operation mode, and a case in which the indoor fans 43 are driven according to the operation mode and the detection values of the refrigerant temperature sensors 47a, 47b, 47c. However, when, for example, the probability of refrigerant leakage is thought to be extremely high because of the results of the detection values of the refrigerant temperature sensors 47a, 47b, 47c, the configuration may have the indoor fans 43 driven irrespective of the operation mode.

(4-4) Modification 1D

In the above embodiment, a case was described in which the indoor machines 40A, 40B are ceiling-mounted indoor units, but the type of indoor machine to which the present invention can be applied is not limited to a ceiling-mounted indoor unit.

Figure 8:
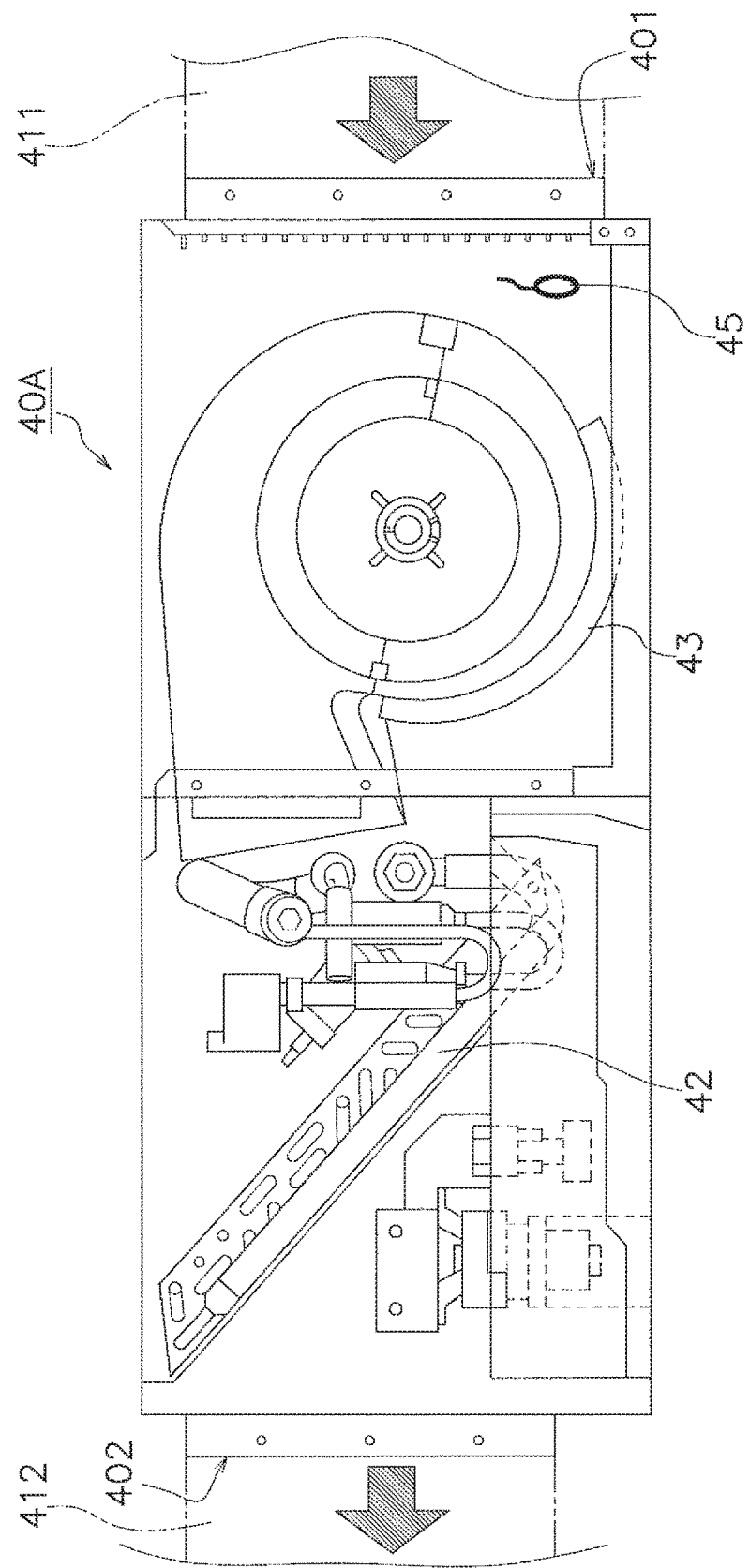
FIG. 8 is a cross-sectional view for describing a summary of a configuration of a ceiling-embedded duct-type indoor machine according to Modification 1D.
Figure 9:
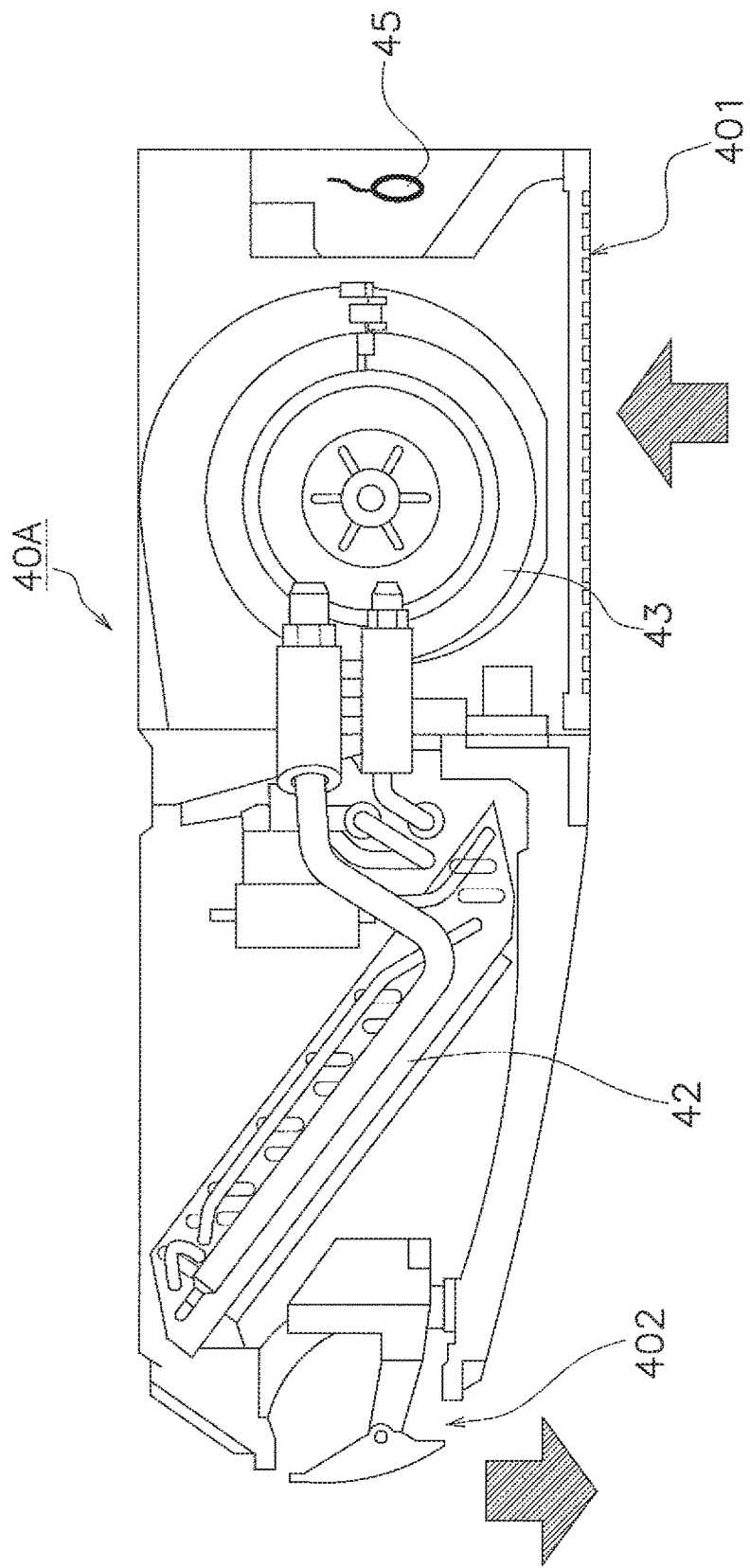
FIG. 9 is a cross-sectional view for describing a summary of a configuration of a ceiling-suspended indoor machine according to Modification 1D.
Figure 10:
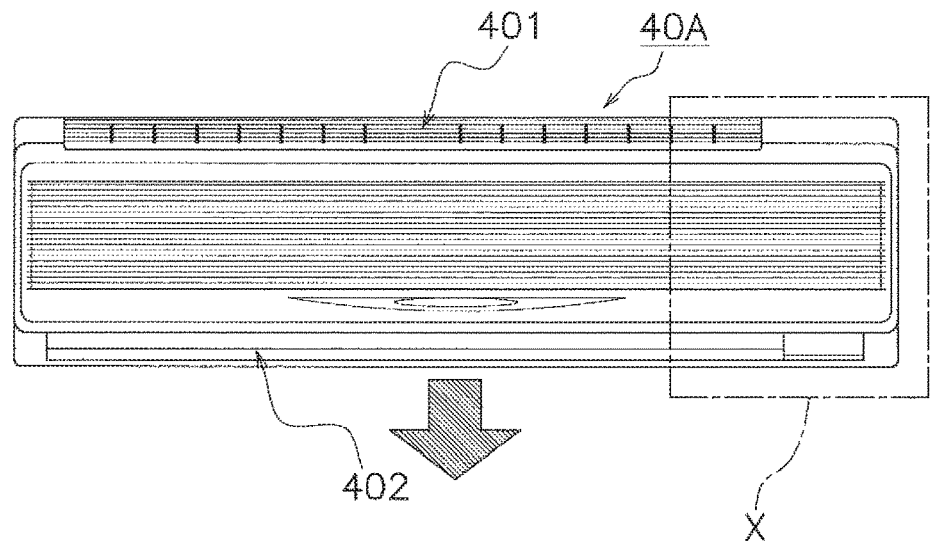
FIG. 10 is a front view for describing a summary of a configuration of a wall-mounted indoor machine according to Modification 1D.
Figure 11:
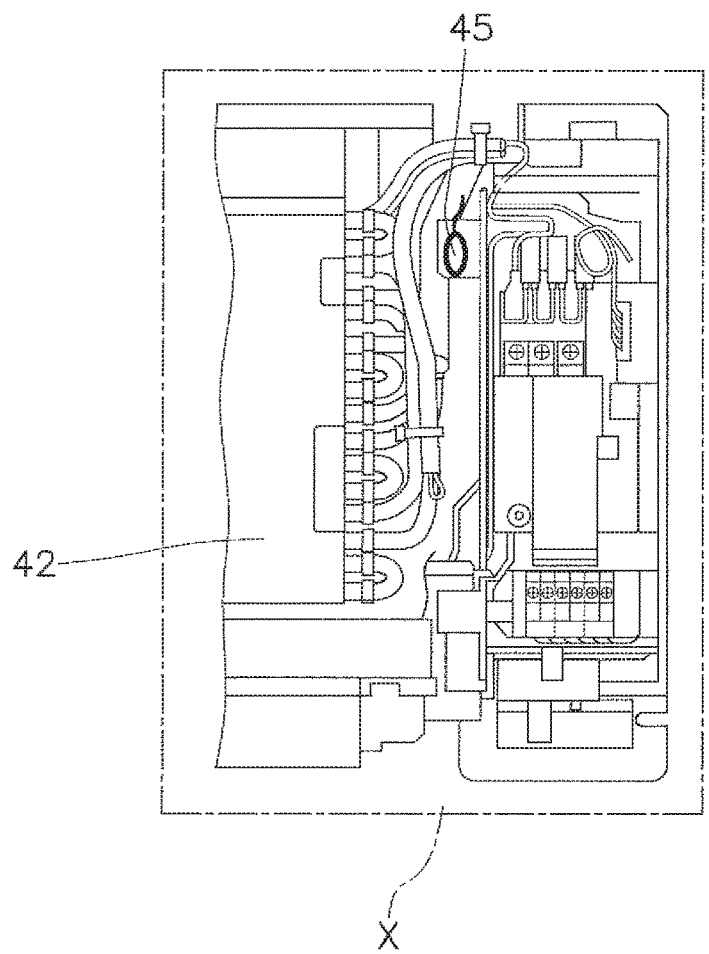
FIG. 11 is a partial enlarged cross-sectional view of area X in the wall-mounted indoor machine according to Modification 10.
Figure 12:
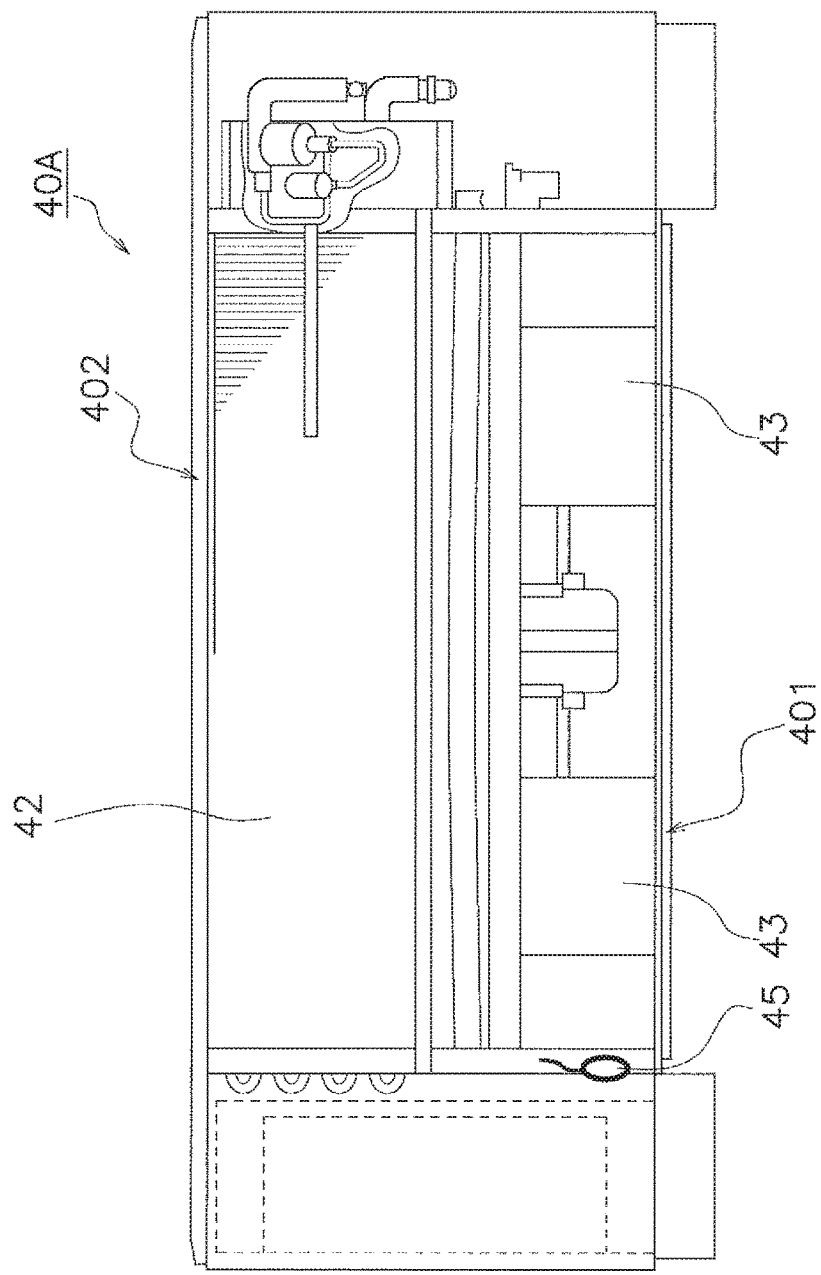
FIG. 12 is a cross-sectional view for describing a summary of a configuration of a floor-standing indoor machine according to Modification 1D.
Figure 13:
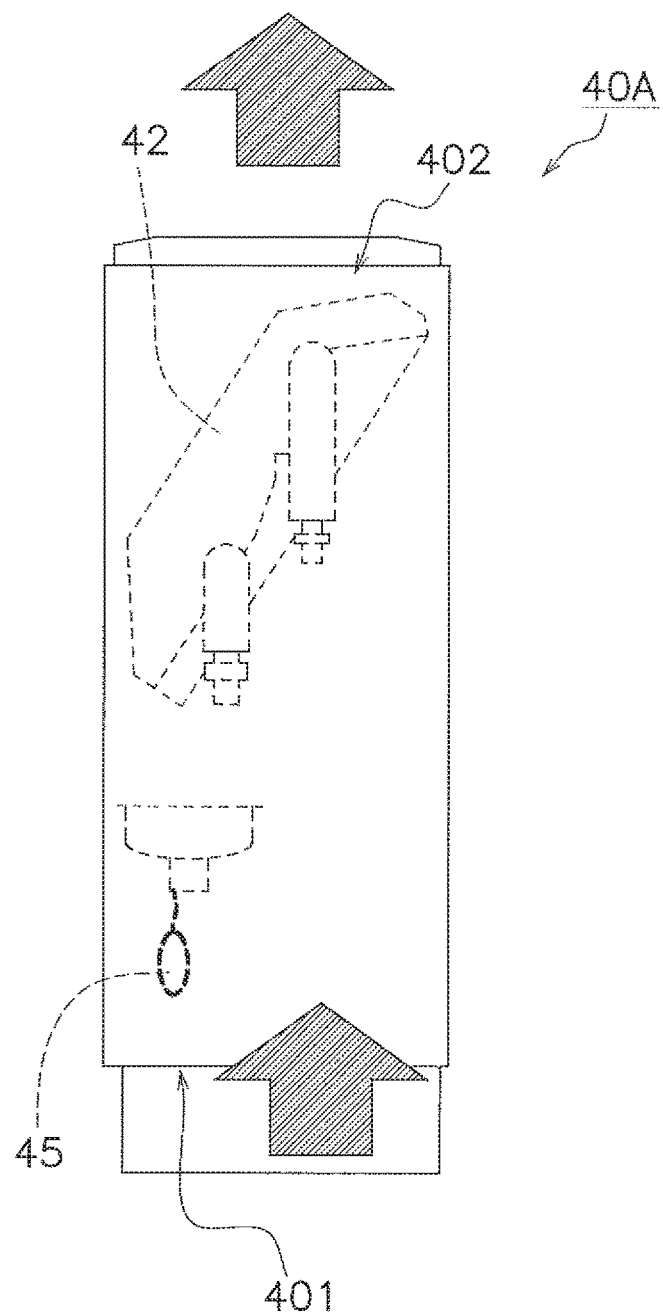
FIG. 13 is a side view for describing a summary of the configuration of the floor-standing indoor machine of FIG. 12.

For example, either one or both of the indoor machines 40A, 40B described above can be replaced by a ceiling-embedded duct-type indoor machine 40A shown in FIG. 8, a ceiling-suspended indoor machine 40A shown in FIG. 9, a wall-mounted indoor machine 40A shown in FIGS. 10 and 11, a floor-standing indoor machine 40A shown in FIGS. 12 and 13, or a combination of these. The number of these types of indoor machines 40A connected to the outdoor machine 20 may be one. FIG. 11 is an enlarged view of the area X enclosed by single-dashed lines in the indoor machine 40A of FIG. 10. FIG. 13 shows a side surface of the indoor machine 40A shown in FIG. 12. The arrows shown in FIGS. 8, 9, 10, and 13 indicate examples of air flows.

In the ceiling-embedded duct-type indoor machine 40A of FIG. 8, ducts 411, 412 are connected at one end to an intake port 401 and a blow-out port 402, respectively. The other ends of the ducts 411, 412 are connected to, e.g., ceiling openings (not shown) or the like. Air is blown out into the room and drawn in from the room through these ceiling openings or the like.

The ceiling-suspended indoor machine 40A of FIG. 9 is attached with the intake port 401 facing downward. The ceiling-suspended indoor machine 40A of FIG. 9 has the intake port 401 and the blow-out port 402 exposed into the room, in the same manner as the ceiling-mounted indoor unit of FIGS. 1 and 2.

The floor-standing indoor machine 40A of FIG. 10 is configured so that indoor air is drawn in from the intake port 401 located in upper portion of the machine, and air is blown out from the blow-out port 402 located in lower portion of the machine. The floor-standing indoor machine 40A of FIG. 10 has the intake port 401 and the blow-out port 402 exposed into the room, in the same manner as the ceiling-mounted indoor unit of FIGS. 1 and 2.

The floor-standing indoor machine 40A of FIG. 13 is configured so that indoor air is drawn in from the intake port 401 separated from the floor and positioned above the floor and located in lower portion of the machine, and air is blown out from the blow-out port 402 located in upper portion of the machine. The floor-standing indoor machine 40A of FIG. 13 has the intake port 401 and the blow-out port 402 exposed into the room, in the same manner as the ceiling-mounted indoor unit of FIGS. 1 and 2.

In the same manner as the indoor machine 40A shown in FIGS. 1 and 2, the indoor machines 40A shown in FIGS. 8 to 13 each have an indoor-side refrigerant circuit (not shown) configuring part of the refrigerant circuit 11, and a flammable refrigerant circulates through the indoor-side refrigerant circuit. The indoor-side refrigerant circuits of the indoor machines 40A of FIGS. 8 to 13 each have an indoor electric valve (not shown) serving as an expansion mechanism, an indoor heat exchanger 42 serving as a usage-side heat exchanger, and a strainer (not shown) to filter impurities in the refrigerant, in the same manner as the refrigerant circuit 11a of FIG. 1. The indoor heat exchangers 42 of the indoor machines 40A of FIGS. 8 to 13, which are cross-fin-type fin-and-tube heat exchangers configured from, e.g., heat transfer tubes and numerous fins, function as refrigerant evaporators to cool an indoor space during a cooling operation, and function as refrigerant condensers to heat the indoor space during a heating operation. The indoor machines 40A of FIGS. 8, 9, and 12 each have an indoor fan 43 serving as an air blower for drawing indoor air into the apparatus, causing heat to be exchanged with the refrigerant in the respective indoor heat exchanger 42, and then supplying the indoor air after heat exchange into the room. Though not shown in FIG. 11, the indoor machine 40A of FIG. 11 also has an indoor fan. The indoor fan of the indoor machine 40A of FIG. 11 is a cross-flow fan of which the length extends substantially horizontally along a longitudinal direction of the indoor heat exchanger 42.

The indoor machines 40A of FIGS. 8 to 13, in the same manner as the indoor machine 40A of FIG. 1, each have a refrigerant tube (not shown) connecting a gas-side connecting part (not shown) and the indoor heat exchanger 42, a refrigerant tube (not shown) connecting the indoor heat exchanger 42 and an indoor electric valve, and a refrigerant tube (not shown) connecting the indoor electric valve and a liquid-side connecting part (not shown).

Furthermore, the indoor machines 40A of FIGS. 8 to 13, in the same manner as the indoor machine 40A of FIG. 1, are each provided with various sensors for controlling a refrigeration cycle, and are also each provided with a refrigerant gas sensor 45. Within the indoor machine 40A, the refrigerant gas sensor 45 detects leaked gas refrigerant when the refrigerant circulating through the indoor-side refrigerant circuit has leaked into the atmosphere. The refrigerant gas sensors 45 of FIGS. 8 to 13 are each connected to a first indoor controller (not shown). The first indoor controllers of FIGS. 8 to 13 are configured in the same manner as the first indoor controller 48A of the indoor machine 40A of FIG. 1. The air-conditioning apparatus according to Modification 1D, having any of the indoor machines 40A of FIGS. 8 to 13, is provided with a control device similar to the control device 30 of the indoor machine 40A of FIG. 1. The indoor machines 40A of FIGS. 8 to 13 each have an intake temperature sensor (not shown) provided to, e.g., the intake port 401, and this sensor measures the temperature of indoor air and transmits a measurement value to the first indoor controller.

The refrigerant gas sensors 45 shown in FIGS. 8 to 13 are each provided in proximity to, e.g., the intake temperature sensor, and are attached in proximity to, e.g., the intake port 401 as shown in FIGS. 8, 9, 11, 12, and 13. In other words, the refrigerant gas sensors 45 are each attached in a position exposed to indoor air drawn in from the intake port 401.

The refrigerant temperature sensor (not shown) of any of the indoor machines 40A of FIGS. 8 to 13, in the same manner as the refrigerant temperature sensor 47a of FIG. 1, detects the temperature of the refrigerant in the refrigerant tube connecting the gas-side connecting part and the indoor heat exchanger 42, and transmits a detection value to the first indoor controller. The refrigerant temperature sensor (not shown) of any of the indoor machines 40A of FIGS. 8 to 13, in the same manner as the refrigerant temperature sensor 47b of FIG. 1, detects the temperature of the refrigerant in the refrigerant tube connecting the indoor heat exchanger 42 and the indoor electric valve, and transmits a detection value to the first indoor controller. The refrigerant temperature sensor (not shown) of any of the indoor machines 40A of FIGS. 8 to 13, in the same manner as the refrigerant temperature sensor 47a of FIG. 1, detects the temperature of the refrigerant in the refrigerant tube connecting the indoor electric valve and the liquid-side connecting part, and transmits a detection value to the first indoor controller.

For the case of an air-conditioning apparatus provided with any of the indoor machines 40A of FIGS. 8 to 13, the procedure for detecting leaked refrigerant is similar to that of the air-conditioning apparatus 10 of FIG. 1 and is therefore not described. In the case of the indoor machine 40A of FIG. 8, because the intake port 401 and the blow-out port 402 are connected with openings provided in the ceiling by the ducts 411, 412, parameters such as the time taken by leaked refrigerant to reach the refrigerant gas sensor 45 are different from those of the air-conditioning apparatus 10 of FIG. 1. Therefore, the details of, e.g., parameters such as the action time for refrigerant leakage detection in an air-conditioning apparatus including the indoor machine 40A of FIG. 8 should be appropriately set according to, e.g., simulations and/or tests with the actual machinery. Such parameters such as action time in the procedure for detecting refrigerant leakage can be set in the indoor machines 40A of FIGS. 9 to 13 in the same manner as in the indoor machine 40A of FIG. 8.

(5) Characteristics (5-1)

As was described above, the control device 30 drives the indoor fan 43 in accordance with the detection values of the refrigerant temperature sensors 47a, 47b, 47c and/or the operation mode, and detects refrigerant leakage by means of the refrigerant gas sensor 45, In the refrigerant leakage detection method described in (2-2-1) above and the refrigerant leakage detection method described in (2-2-2), the indoor fan 43 is driven in accordance with the operation mode. Thus, when each of the indoor fans 43 is driven in the sample operation, leaked refrigerant accumulated in the room RM below the indoor machines 40A, 40B can be drawn into each of the indoor machines 40A, 40B by airflow produced by the driving of each of the indoor fans 43, and the refrigerant leakage can be detected by each of the refrigerant gas sensors 45 using the leaked. refrigerant drawn in from the room RM. Therefore, even when leaked refrigerant has leaked into the room RM through path undetectable to each of the refrigerant gas sensors 45 while each of the indoor fans 43 have stopped, the refrigerant can be detected by each of the refrigerant gas sensors 45 during the sample operation. As a result, the reliability of refrigerant leakage detection is improved in the air-conditioning apparatus 10.

(5-2)

The refrigerant temperature sensor 47a, which is a first refrigerant temperature sensor, is disposed between the gas-side connecting part 49g and the indoor heat exchanger 42; the refrigerant temperature sensor 47b, which is a second refrigerant temperature sensor, is disposed between the indoor heat exchanger 42 and the indoor electric valve 41; and the refrigerant temperature sensor 47c, which is a third refrigerant temperature sensor, is disposed between the indoor electric valve 41 and the liquid-side connecting part 49f. Using these refrigerant temperature sensors 47a, 47b, 47c, the possibility of refrigerant leakage can be predicted without using the refrigerant gas sensor 45 in most parts of each of the indoor-side refrigerant circuits 11a, 11b. As a result, the sampling operation can be performed to drive the indoor fan 43 when the possibility of refrigerant leakage is high, the sampling operation can be reduced when the possibility of refrigerant leakage is low, the number of sampling operations can be reduced while improving the reliability of refrigerant leakage detection, and decrease in comfort can be restrained by increasing the number of sampling operations.

(5-3)

Because the refrigerant, which has a greater specific gravity when gasified than air, may accumulate in the bottom part of the space in the room RM and concentration may rise due to the operations of the indoor machines 40A, 40B stopping, the indoor machines 40A, 40B perform the sampling operation when operations for air conditioning have been stopped, whereby the reliability of refrigerant leakage detection is improved.

(5-4)

The display device 51 of the remote controller 50 displays operation information informing that the driving of the indoor fan 43 is for the sampling operation. As a result, the user can recognize, through the operation information displayed on the display device 51, the conditions in which the sampling operation is carried out, and the problem of the user mistaking the sampling operation for an erroneous action of the air-conditioning apparatus 10 can be prevented.

(5-5)

Because each of the states of the indoor-side refrigerant circuits 11a, 11b does not stabilize immediately after each of the indoor machines 40A, 40B has stopped operating, it is difficult to determine whether or not the sampling operation is necessary in accordance with the detection values of the refrigerant temperature sensors 47a, 47b, 47c. However, a difficult determination of whether or not the sampling operation is necessary can be avoided by having the sampling operation be performed immediately after the indoor machines 40A, 40B have stopped operating. As a result, difficulty of determining whether or not the sampling operation is necessary is avoided, and the reliability of refrigerant leakage detection can be improved.

(5-6)

When the indoor machines 40A, 40B, which are indoor units, and the outdoor machine 20, which is an outdoor unit, have stopped, the indoor-side refrigerant circuits stabilize and it becomes easy to predict the possibility of refrigerant leakage through the differences in detection values between the refrigerant temperature sensors 47a, 47b, 47c and the intake temperature sensors 46, which are indoor temperature sensors, and when the differences in detection values between the indoor temperature sensors and the refrigerant temperature sensors 47a, 47b, 47c are equal to or greater than a threshold value, the control device determines there is a high probability of refrigerant leakage. In view of this, during the indoor machines 40A. 40B and the outdoor machine 20 have stopped, the sampling operation is performed when the difference in detection values between an intake temperature sensor 46 and at least one refrigerant temperature sensor is equal to or greater than a threshold value, whereby a sampling operation at an unnecessary timing can be omitted while the reliability of refrigerant leakage detection is improved, and decrease in comfort because the sampling operation can be restrained.

(5-7)

Even if one unit among the indoor machine 40A, which is a first indoor unit and the indoor machine 40B, which is a second indoor unit stops operating, when the other unit is operated and the outdoor machine 20 continues to operate, the state of the indoor-side refrigerant circuit 11a or 11b of the one unit does not stabilize, and it is therefore difficult to determine whether or not the sampling operation of the one unit is necessary in accordance with the detection values of the refrigerant temperature sensors 47a, 47b, 47c of the one unit that has stopped. In view of this, even if operation of the one unit (the indoor machine 40A in the description of (2-2-2) above) has been stopped, the sampling operation for the one unit is performed intermittently, whereby it is possible to avoid a difficult determination of whether or not the sampling operation of the one unit (the indoor machine 40A) is necessary. As a result, it is possible to improve the reliability of refrigerant leakage detection when the outdoor machine 20 is operated and one of the indoor machines 40A, 40B has stopped.

What is claimed is:

1. An air-conditioning apparatus, comprising:
at least one indoor unit in which an intake port and a blow-out port are formed, the indoor unit having
an indoor fan drawing indoor air in from the intake port and blowing conditioned air out from the blow-out port,
an indoor temperature sensor arranged to detect a temperature of the indoor air,
an indoor-side refrigerant circuit circulating a refrigerant having a greater specific gravity when gasified than air and producing conditioned air from the indoor air, and
at least one refrigerant temperature sensor arranged to detect a temperature of the refrigerant in the indoor-side refrigerant circuit;
a refrigerant gas sensor disposed in an air flow path inside the at east one indoor unit;
an electronic controller
driving the indoor fan in accordance with at least one of an operation mode and a detection value of the at least one refrigerant temperature sensor, and
detecting refrigerant leakage using the refrigerant gas sensor; and
an outdoor unit connected to the at least one indoor unit,
the electronic controller causing the at least one indoor unit to perform a sampling operation in which the indoor fan is driven in order to detect refrigerant leakage using the refrigerant gas sensor when an operation for air conditioning has been stopped,
the extronic controller causing the at least one indoor unit to perform the sampling operation when
the at east one indoor unit and the outdoor unit have stopped, and
a difference in detection values between the indoor temperature sensor and the at least one refrigerant temperature sensor is equal to or greater than a threshold value.

2. The air-conditioning apparatus according to claim 1, wherein
the indoor-side refrigerant circuit of the at least one indoor unit has a liquid-side connecting part, a gas-side connecting part, an indoor heat exchanger, and an indoor electric valve connected to a liquid side of the indoor heat exchanger, and
the at least one refrigerant temperature sensor of the at least one indoor unit includes
a first refrigerant temperature sensor disposed between the gas-side connecting part and the indoor heat exchanger,
a second refrigerant temperature sensor disposed between the indoor heat exchanger and the indoor electric valve, and
a third refrigerant temperature sensor disposed between indoor electric valve and the liquid-side connecting part.

3. The air-conditioning apparatus according to claim 1, further comprising:
a display device controlled by the electronic controller,
the electronic controller causing the display device to display operation information informing that the driving of the indoor fan is for the sampling operation.

4. The air-conditioning apparatus according to claim 1, wherein
the electronic controller causes the at least one indoor unit to perform the sampling operation for a predetermined time duration immediately after the at least one indoor unit has stopped.

5. An air-conditioning apparatus, comprising:
at least one indoor unit in which an intake port and a blow-out port are formed, the indoor unit having
an indoor fan drawing indoor air in from the intake port and blowing conditioned air out from the blow-out port,
an indoor temperature sensor arranged to detect a temperature of the indoor air,
an indoor-side refrigerant circuit circulating a refrigerant having a greater specific gravity when gasified than air and producing conditioned air from the indoor air, and
at least one refrigerant temperature sensor arranged to detect a temperature of the refrigerant in the indoor-side refrigerant circuit
a refrigerant gas sensor disposed in an air flow path inside the at least one indoor unit;
an electronic controller
driving the indoor fan in accordance with at least one of an operation mode and a detection value of the at least one refrigerant temperature sensor, and
detecting refrigerant leakage using the refrigerant gas sensor; and
an outdoor unit connected to the at least one indoor unit,
the electronic controller causing the at least one indoor unit to perform a sampling operation in which the indoor fan is driven in order to detect refrigerant leakage using the refrigerant gas sensor when an operation for air conditioning has been stopped,
the at least one indoor unit including a first indoor unit and a second indoor unit connected to the outdoor unit, and
when one of the first indoor unit and the second indoor unit has stopped operating, the other unit is continuing to operate, and the outdoor unit is continuing to operate, the electronic controller causing the one of the first indoor unit and the second indoor unit that has stopped operating to intermittently perform the sampling operation.

6. The air-conditioning apparatus according to claim 2, wherein
the electronic controller causes the at least one indoor unit to perform a sampling operation in which the indoor fan is driven in order to detect refrigerant leakage using the refrigerant gas sensor when an operation for air conditioning has been stopped.

7. The air-conditioning apparatus according to claim 6, further comprising:
a display device controlled by the electronic controller,
the electronic controller causing the display device to display operation information informing that the driving of the indoor fan is for the sampling operation.

8. The air-conditioning apparatus according to claim 3, wherein
the electronic controller causes the at least one indoor unit to perform the sampling operation for a predetermined time duration immediately after the at least one indoor unit has stopped.

9. The air-conditioning apparatus according to claim 3, further comprising:
an outdoor unit connected to the at least one indoor unit,
the at least one indoor unit including a first indoor unit and a second indoor unit connected to the outdoor unit, and
when one of the first indoor unit and the second indoor unit has stopped operating, the other unit is continuing to operate, and the outdoor unit is continuing to operate,
the electronic controller causing the one of the first indoor unit and the second indoor unit that has stopped operating to intermittently perform the sampling operation.

10. The air-conditioning apparatus according to claim 4, further comprising:
an outdoor unit connected to the at least one indoor unit,
the at least one indoor unit including a first indoor unit and a second indoor unit connected to the outdoor unit, and
when one of the first indoor unit and the second indoor unit has stopped operating, the other unit is continuing to operate, and the outdoor unit is continuing to operate,
the electronic controller causing the one of the first indoor unit and the second indoor unit that has stopped operating to intermittently perform the sampling operation.

\* \* \* \* \*